(Model.)

H. L. CHAPMAN.
LACE CUTTER.

No. 247,306. Patented Sept. 20, 1881.

WITNESSES:
Chas. Nide.
C. Sedgwick

INVENTOR:
H. L. Chapman
BY Munn & Co
ATTORNEYS.

UNITED STATES PATENT OFFICE.

HERMAN L. CHAPMAN, OF MARCELLUS, MICHIGAN.

LACE-CUTTER.

SPECIFICATION forming part of Letters Patent No. 247,306, dated September 20, 1881.

Application filed February 28, 1881. (Model.)

*To all whom it may concern:*

Be it known that I, HERMAN L. CHAPMAN, of Marcellus, in the county of Cass and State of Michigan, have invented a new and Improved Lace-Cutter, of which the following is a full, clear, and exact description.

The object of my invention is to provide a new and simple device for cutting laces out of leather.

The invention consists in a longitudinally slotted or split handle having the cutter fastened to its outer end surface in such a manner that the cutting-edge crosses the slot diagonally, through which slot an adjustable gage for regulating the width of the lace passes, and can be locked in any desired position by means of a binding-screw.

Figure 1:
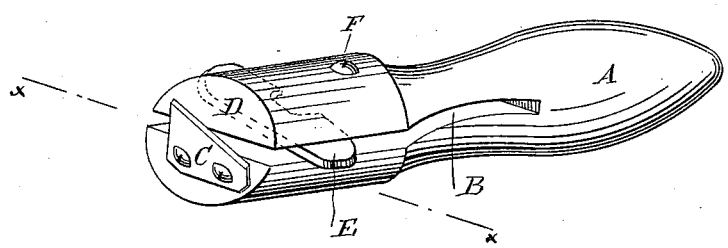
Figure 2:
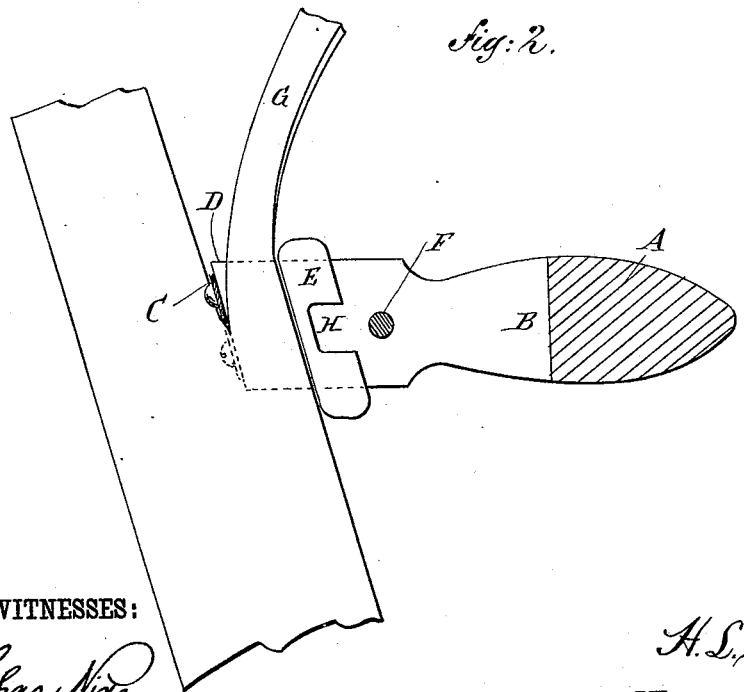

In the accompanying drawings, Figure 1 is a perspective view of my improved lace-cutter. Fig. 2 is a longitudinal elevation of the same, showing the manner in which it cuts.

Similar letters of reference indicate corresponding parts.

The handle A is provided with a longitudinal slot, B, which extends almost to the inner end of the same. A knife, C, is fastened to the outer end surface, D, of the handle in such a manner that the cutting-edge of the knife passes diagonally over the end of the slot. The end surface, D, is slightly inclined, as shown in Fig. 2, as it makes cutting easier. A gage, E, passes through the slot, and can be held in any desired position in the same by means of the binding-screw F, which presses the two shanks of the slotted handle together. This gage is used to regulate the width of the lace G, the outer edge of which passes along the outer edge of the gage, as shown in Fig. 2. The gage is provided with a recess, H, in its inner edge, for admitting the screw F when a very wide lace is being cut.

Having thus described my invention, I claim as new and desire to secure by Letters Patent—

1. A lace-cutter made substantially as herein shown and described, and consisting of a longitudinally-slotted handle having a knife attached to its outer end and arranged diagonally across the slot, as set forth.

2. In a lace-cutter, the combination, with the longitudinally-slotted handle A, of the knife C and the adjustable gage, substantially as herein shown and described, and for the purpose set forth.

HERMAN LAROY CHAPMAN.

Witnesses:
W. J. SAMPSON,
MARY C. IVESON.